United States Patent [19]

Tamura

[11] Patent Number: 4,531,878
[45] Date of Patent: Jul. 30, 1985

[54] DAYLIGHT FILM LOADING METHOD AND APPARATUS

[75] Inventor: Kaoru Tamura, Kanagawa, Japan

[73] Assignee: Fuji Photo Film Co., Ltd., Kanagawa, Japan

[21] Appl. No.: 524,639

[22] Filed: Aug. 19, 1983

[30] Foreign Application Priority Data

Aug. 20, 1982 [JP] Japan .................................. 57-144200

[51] Int. Cl.$^3$ .............................................. B65G 65/00
[52] U.S. Cl. .................................... 414/412; 378/173;
414/786; 271/18
[58] Field of Search ............... 414/403, 404, 405, 411, 414/412, 786, 43; 354/212, 319, 320; 378/173; 271/18, 267

[56] References Cited

U.S. PATENT DOCUMENTS

| | | | |
|---|---|---|---|
| 3,487,966 | 1/1970 | Kampf | 414/412 |
| 3,790,160 | 2/1974 | Schmidt | 271/18 |
| 3,912,932 | 10/1975 | Matsumoto et al. | 378/173 X |
| 3,934,150 | 1/1976 | Matsumoto et al. | 414/412 |
| 3,934,735 | 1/1976 | Schmidt | 271/18 X |
| 4,163,499 | 8/1979 | Schmidt | 414/411 |
| 4,201,919 | 5/1980 | Schmidt | 414/412 X |
| 4,260,896 | 4/1981 | Schmidt | 378/173 |

Primary Examiner—Robert J. Spar
Assistant Examiner—Stuart J. Millman
Attorney, Agent, or Firm—Sughrue, Mion, Zinn, Macpeak and Seas

[57] ABSTRACT

A film package containing a stack of films in a light-tight envelope is held vertically in a light-tight loading chamber, and a lower end of the envelope is cut while at least the films are prevented from falling. A film receiving case is moved upwardly to the vicinity of the lower end of the film package, and the films are allowed to fall onto the case. The case is then moved down to completely separate the films from the light-tight envelope, and a shutter is closed between the envelope and the films to shield the films from light.

10 Claims, 24 Drawing Figures

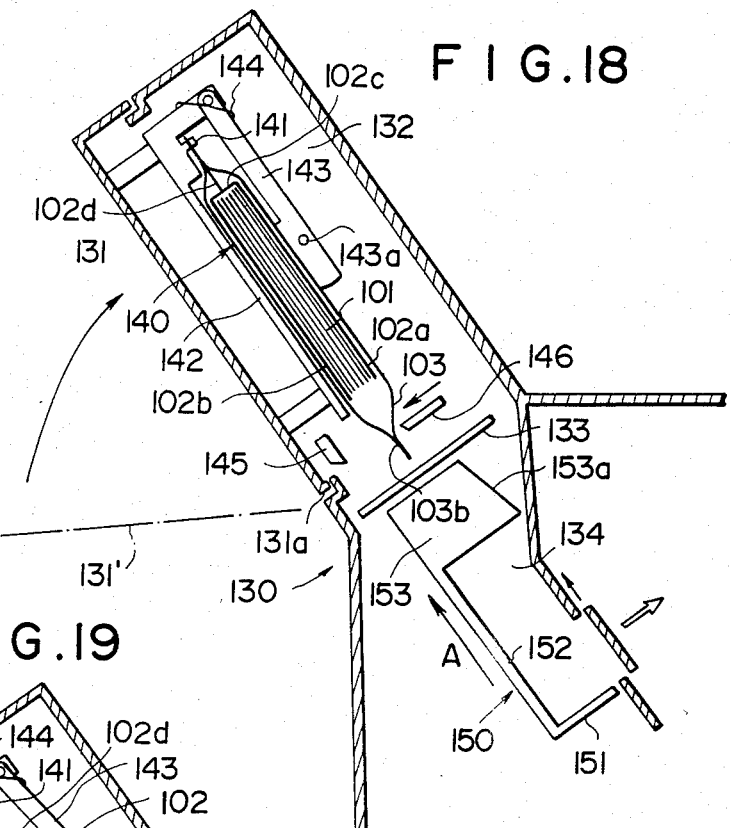
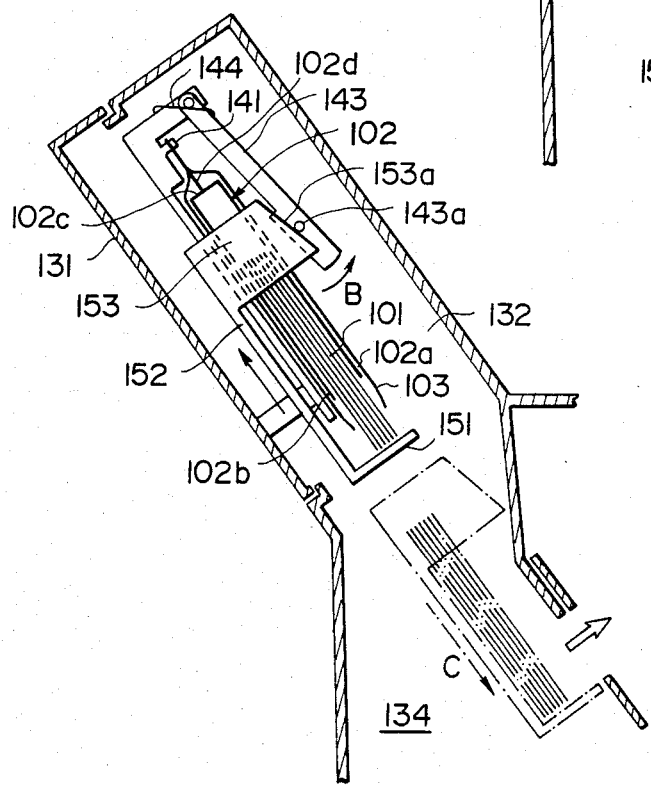

DAYLIGHT FILM LOADING METHOD AND APPARATUS

BACKGROUND OF THE INVENTION

1. Field of the Invention

This invention relates to a method of loading sheet-like light-sensitive films such as image recording photographic films or X-ray photographic films into an image recording apparatus, an X-ray image recording apparatus, or the like in a daylight environment, and an apparatus for carrying out the method.

2. Description of the Prior Art

There have heretofore been known various methods of and apparatus for loading X-ray films or the like into a cassette in a daylight environment. In the conventional techniques, after a film package comprising a light-tight envelope and films contained therein is loaded into a light-tight chamber, the light-tight envelope is separated from the films or the films are drawn out of the light-tight envelope. However, these techniques have drawbacks that the construction of the loading apparatus becomes complicated and that there is a risk of the films being damaged.

For example, Japanese Unexamined Utility Model Publication No. 54(1979)-43328 discloses a cassette magazine constructed so that a light-tight envelope can be drawn out of a film package in a cassette to make it possible to handle films in a daylight environment. However, this technique requires a means for drawing out the light-tight envelope. Further, in a method of and apparatus for loading X-ray films disclosed in U.S. Pat. No. 4,201,919, in order to conduct film loading in a daylight environment, a light-tight envelope of a film package is cut open in a condition shielded from light, and films are allowed to fall from the light-tight envelope. In this technique, however, the films do not fall together with one another but fall separately from one another and, therefore, they are readily damaged.

SUMMARY OF THE INVENTION

The primary object of the present invention is to provide a method of loading the films into a cassette, an image recording apparatus, or the like, in a daylight environment in a simple manner without damaging the films.

Another object of the present invention is to provide an apparatus for carrying out the method.

The present invention provides a method of loading films in a daylight environment by holding a film package, which comprises a light-tight envelope and a stack of unexposed light-sensitive films contained therein, in a vertical position in a loading chamber shielded from light, opening a lower end of said light-tight envelope while at least the films are prevented from falling, and then releasing said films with said light-tight envelope being held, thereby allowing said films to fall from said light-tight envelope by weight thereof, wherein the improvement comprises moving a film receiving case for receiving said films to the vicinity of the lower end of said film package before said films are allowed to fall, moving down said film receiving case after said films fall, thereby completely separating said films from said light-tight envelope, and thereafter closing a shutter between said light-tight envelope and said films to shield said films from light. After the shutter is closed to shield the films from light, it becomes possible to open the loading chamber above the shutter and remove the empty light-tight envelope. A new film package can then be loaded to the loading chamber. In the chamber below the shutter, the films can be sent one by one or in the form of the stack from the film receiving case to an image recording section.

The daylight film loading apparatus in accordance with the present invention comprises:

(i) a first light-tight housing provided with an openable cover, (ii) a second light-tight housing provided with a film exit and positioned under said first light-tight housing, (iii) a shutter openably mounted between said first light-tight housing and said second light-tight housing, (iv) a means for holding a film package, which comprises a light-tight envelope and a stack of films contained therein, in a vertical position in said first light-tight housing, (v) a means for holding said light-tight envelope of said film package and releasing said film stack in said first light-tight housing, (vi) a means for opening a lower end of said light-tight envelope, and (vii) a film receiving case capable of reciprocating between a film receiving position below and near said film package in said first light-tight housing and a film storing position in said second light-tight housing.

As the means for holding the film package and the means for releasing only the films, various configurations may be employed. Some examples thereof will be described later with reference to preferred embodiments of the present invention.

In the present invention, since the film receiving case moves upwardly to a point near the film falling position and receives the stack of the films falling from the light-tight envelope, there is no risk of the films being separated from one another and damaged when the films fall from the light-tight envelope. Therefore, invention makes it possible to efficiently conduct the image recording operations, or the like, without any problem or failure.

By "holding the film package in a vertical position" is meant such holding that, when holding is released, the film package will move by its weight in the direction along the surface of the film package. Namely, "vertical position" embraces not only the position at right angles to the horizontal position but also an inclined position.

BRIEF DESCRIPTION OF THE DRAWINGS

FIGS. 18 and 19 are sectional side views showing a further embodiment of the daylight film loading apparatus in accordance with the present invention, wherein the film package of FIGS. 14 and 15 is used.

DESCRIPTION OF THE PREFERRED EMBODIMENTS

The present invention will hereinbelow be described in further detail with reference to the accompanying drawings.

Figure 1:
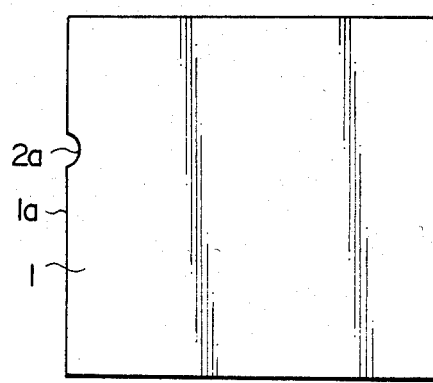
FIGS. 1 to 4 are plan views showing various embodiments of the film used in the daylight film loading method in accordance with the present invention.
Figure 2:
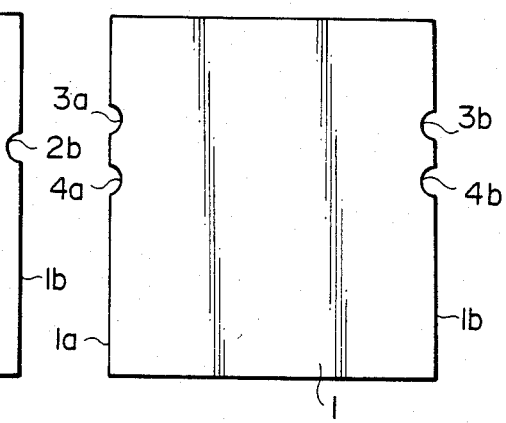
Figure 3:
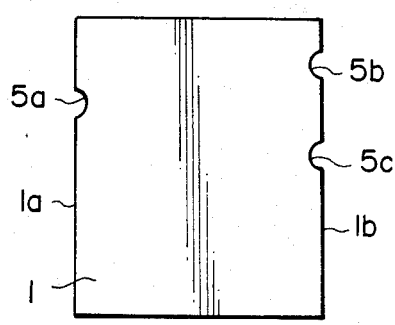
Figure 4:
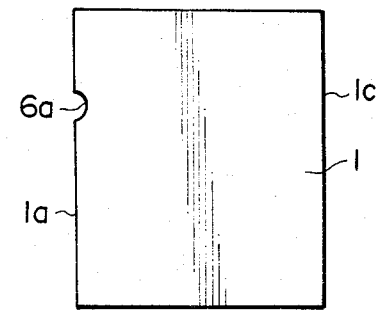

FIGS. 1 to 4 show various embodiments of the film used in an embodiment of the daylight film loading apparatus in accordance with the present invention. A film 1 is an unexposed rectangular light-sensitive film, and at least one clamp notch is formed at a side edge or side edges of the film 1. In FIG. 1, a notch 2a is formed at a side edge 1a, and a notch 2b is formed at the other side edge 1b. In FIG. 2, notches 3a and 4a are formed at the side edge 1a, and notches 3b and 4b are formed at the other side edge 1b. In FIG. 3, a notch 5a is formed at the side edge 1a, and notches 5b and 5c are formed at the other side edge 1b in such a manner that the middle point between the notches 5b and 5c is symmetric with respect to the notch 5a. In FIG. 4, a notch 6a is formed at the side edge 1a, and no notch is formed at the other side 1c. The notches 2a, 2b, 3a, 4a, 3b, 4b, 5a, 5b, 5c and 6a have a size and a shape suitable for certainly hanging the film 1 when the notches are engaged with clamp members such as claws or bars. When the notch 6a is formed only at one side edge 1a of the film 1 as shown in FIG. 4, the other side edge 1c having no notch is pushed against a flat contact face (or a contact plate is pushed against the side edge 1c), and only the notch 6a is engaged with a clamp member to hang the film 1. By "hanging" is meant not only that the film 1 is hung exactly vertically in a space but also that the film 1 is placed, for example, on an inclined surface and supported thereon through the engagement of the notch or notches of the film 1 with a clamp member or clamp members such as pins.

An embodiment of the daylight film loading method and apparatus in accordance with the present invention, wherein the films as shown in FIG. 1 are used, will now be described below.

Figure 5:
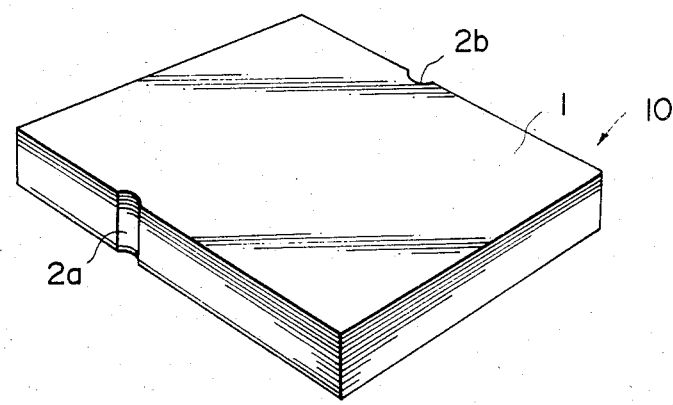
FIG. 5 is a perspective view showing an embodiment of a stack of the films used in the daylight film loading method in accordance with the present invention.
Figure 6:
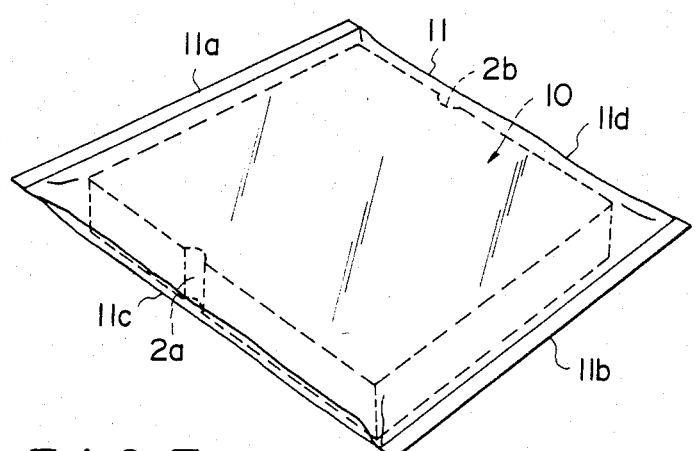
FIG. 6 is a perspective view showing an embodiment of the film package comprising a light-tight envelope and a stack of the films as shown in FIG. 5.

The films 1 as shown in FIG. 1 are laid one upon another by aligning the notch positions as shown in FIG. 5 to form a film stack 10. The film stack 10 is then inserted into a flexible light-tight envelope 11 as shown in FIG. 6. The light-tight envelope 11 may be made of polyethylene, polypropyrene, polyvinyl chloride-polyvinyl acetate, or the like, containing a light-absorbing pigment or an opacifier such as carbon black. Alternatively, the light-tight envelope 11 may be made of opaque multi-ply paper, for example, two-ply paper wherein one ply is opaque. The light-tight envelope 11 is made by heat sealing both end edges 11a and 11b of a cylindrical polyethylene film. The side portions 11c and 11d of the light-tight envelope 11 are soft so that, when the side portions 11c and 11d are held by clamp bar members from outside thereof, the clamp bar members can sufficiently fit into and engage with the notches 2a and 2b at the side edges of the film stack 10.

Figure 7:
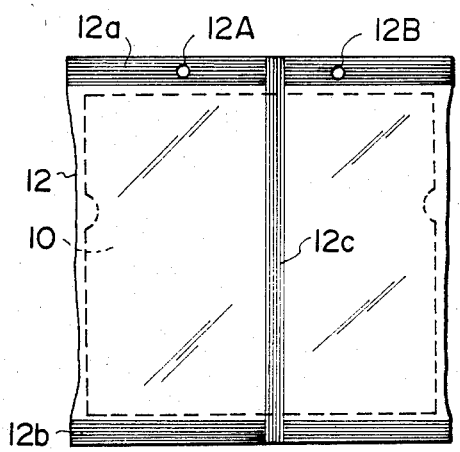
FIG. 7 is a plan view showing another embodiment of the film package.

In the film package shown in FIG. 7, it is possible to hang the film stack 10 as described above by sandwiching the film stack 10 from outside the light-tight envelope 11 by use of the clamp bar members. When the lower end edge of the light-tight envelope 11 is cut while the light-tight envelope 11 is held in the aforesaid condition by an appropriate means, and then the clamp bar members are simultaneously disengaged from the notches 2a and 2b of the film stack 10, the film stack 10 falls from the light-tight envelope 11 into a receiving case positioned below the film package. This step is conducted in a condition shielded from light, and then a light-shielding cover is closed on the receiving case to complete film loading in a daylight environment.

In the film package as described above, in order to facilitate holding of the light-tight envelope 11 when allowing the film stack 10 to fall from the light-tight envelope 11, it is advantageous to form clamp holes at a part, for example, a heat seal portion, of the light-tight envelope 11. FIG. 7 shows such an embodiment of the film package. In the embodiment of FIG. 7, the film stack 10 is contained in a light-tight envelope 12 provided with clamp holes 12A and 12B at a heat seal portion 12a at one end edge. The light-tight envelope 12 is made by heat sealing the upper end edge portion 12a, a lower end edge portion 12b and a middle portion 12c of a light-tight film made of polyethylene or the like. In this embodiment, since the light-tight envelope 12 is provided with the clamp holes 12A and 12B, it is possible to hold the light-tight envelope 12 by engaging the clamp holes 12A and 12B with pins or the like of the loading apparatus when making the film stack 10 fall down from the light-tight envelope 12. Therefore, the film stack 10 can be certainly and easily separated from the envelope 12.

Figure 7A:
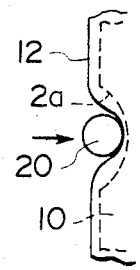
FIG. 7A is an enlarged view showing a part of the film package shown in FIG. 7 together with a clamp member.

FIG. 7A shows a condition of clamping the film package shown in FIG. 7 by use of a clamp bar member 20. The bar member 20 is engaged with the notch 2a of the film stack 10 contained in the light-tight envelope 12. Since the light-tight envelope 12 is sufficiently flexible, it is deformed along the notch 2a by the bar member 20, and the bar member 20 can certainly hold the film stack 10.

When the films 1 of the film package are not so rigid, a protective sheet may be contained together with the film stack 10 to protect the films 1 from mechanical damage.

FIGS. 8 to 11 show various embodiments of the film package used in accordance with the present invention, wherein a protective sheet is contained together with the films.

Figure 8:
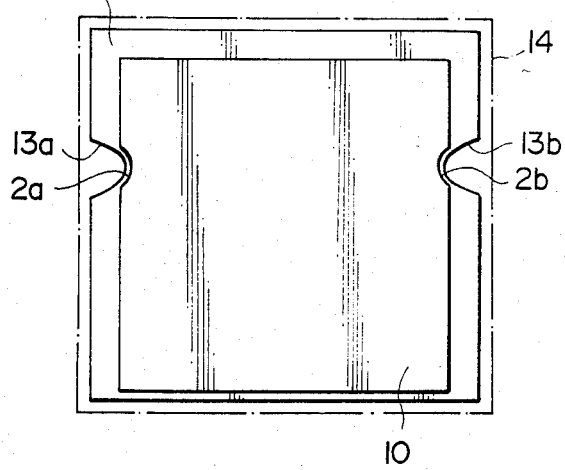
FIG. 8 is a plan view showing a further embodiment of the film package.
Figure 8A:
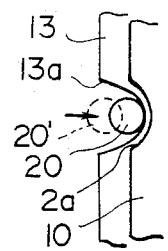
FIG. 8A is an enlarged view showing a part of the film package shown in FIG. 8 together with a clamp member.

In FIG. 8, a protective sheet 13 wider than the film stack 10 and having notches 13a and 13b deeper than the notches 2a and 2b of the film stack 10 is used. As shown in FIG. 8A, when the clamp bar member 20 is moved away from the film stack 10, the clamp bar member 20 is first disengaged from the notch 2a of the film stack 10. When the clamp bar member 20 moves up to a position 20' indicated by a broken line, the notch 2a of the film stack 10 is released from the clamp bar member 20, and only the notch 13a of the protective sheet 13 remains engaged with the bar member 20. Therefore, the protective sheet 13 is maintained in the clamped position together with the light-tight envelope 14, and only the film stack 10 is allowed to fall down.

Figure 9:
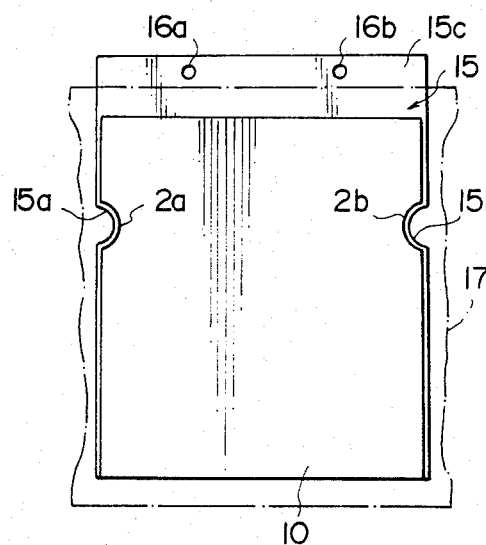
FIGS. 9, 10 and 11 are plan views showing further embodiments of the film package.

In FIG. 9, a protective sheet 15 has the same width as the width of the film stack 10 and has notches 15a and 15b of the same size as the notches 2a and 2b of the film stack 10. However, the protective sheet 15 is longer than the film stack 10 and provided with clamp holes 16a and 16b at a portion 15c projected upwardly from the upper end of the film stack 10. The projected portion 15c extends beyond the upper end of a light-tight envelope 17 and is secured to the light-tight envelope 17 in the vicinity of the projected portion 15c. When clamp bar members are disengaged from the notches 2a and 2b of the film stack 10 to make the film stack 10 fall, the clamp bar members also release the protective sheet 15. However, since the protective sheet 15 is clamped by pins or the like of the loading apparatus which engage with the clamp holes 16a, and 16b of the protective sheet 15 and the light-tight envelope 17 is secured to the protective sheet 15, only the film stack 10 falls and is certainly separated from the light-tight envelope 17 and the protective sheet 15.

Figure 10:
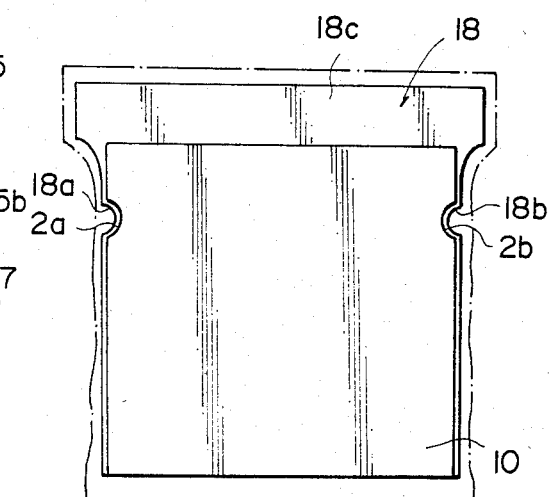

In FIG. 10, a protective sheet 18 has a widened portion 18c, which is wider than the film stack 10, at the upper end edge portion. In this embodiment, when clamp bar members are disengaged from the notches 18a and 18b of the protective sheet 18 (and also from the notches 2a and 2b of the film stack 10), the widened portion 18c engages with the clamp bar members and prevents the protective sheet 18 from falling.

Figure 11:
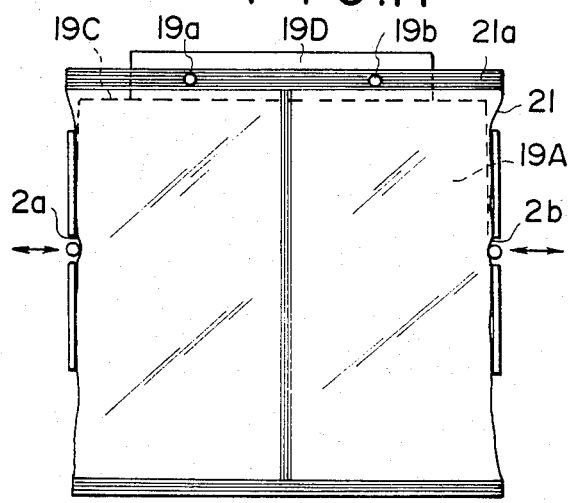
Figure 11A:
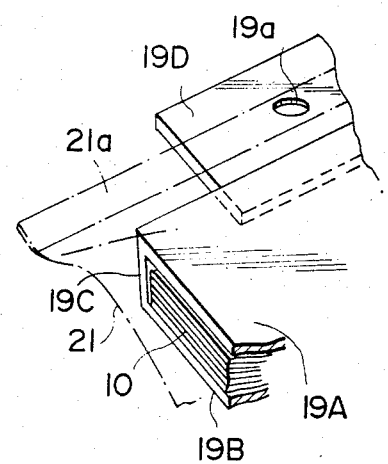
FIG. 11A is an enlarged view showing a part of the film package shown in FIG. 11.

In FIG. 11, a pair of protective sheets 19A and 19B sandwiching the film stack 10 from the front side and the rear side of the film stack 10 are joined at the upper ends to form a U-shaped cross-section as shown in FIG. 11A. A projected portion 19D is secured to the middle of the upper end connecting portion 19C. The projected portion 19D is secured to an upper end edge seal portion 21a of the light-tight envelope 21 and provided with clamp holes 19a and 19b. In this embodiment, clamp holes 19a and 19b are perforated through the upper end edge seal portion 21a of the light-tight envelope 21 and also through the projected portion 19D of the protective sheets 19A and 19B. The light-tight envelope 21 and the protective sheets 19A and 19B are held by clamp members engaging with the clamp holes 19a and 19b.

Figure 12:
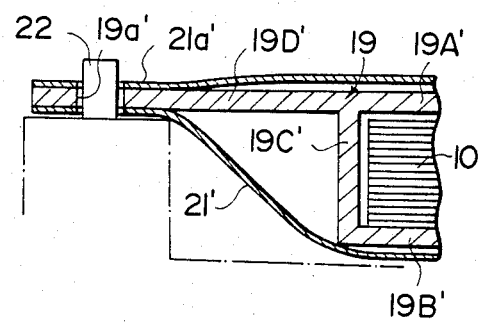
FIG. 12 is a partial enlarged view showing a modified form of the film package shown in FIG. 11.

FIG. 12 shows a modified form of the film package shown in FIG. 11. In FIG. 12, protective sheets 19A' and 19B' are joined with each other at a connecting portion 19C'. A projected portion 19D' is formed by elongating the protective sheet 19A'. The projected portion 19D' is secured to a seal portion 21a' of a light-tight envelope 21', and a clamp hole 19a' is perforated through the projected portion 19D' and the seal portion 21a'. In FIG. 12, a clamp pin 22 for engagement with the clamp hole 19a' is also shown.

Figure 13:
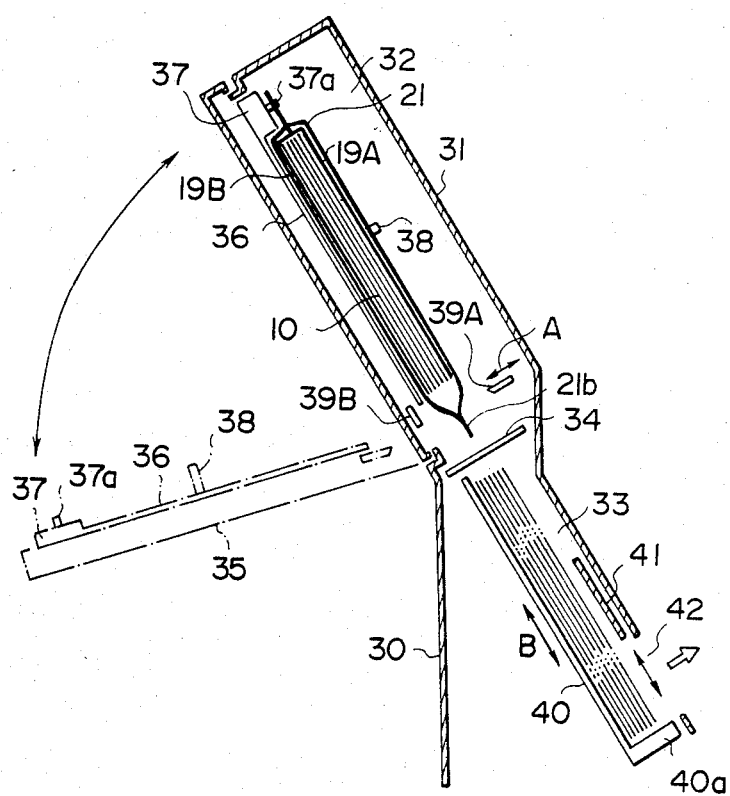
FIG. 13 is a sectional side view showing an embodiment of the daylight film loading apparatus in accordance with the present invention, wherein the film package of FIG. 11 is used.

FIG. 13 shows an embodiment of the daylight film loading apparatus in accordance with the present invention, wherein the film package shown in FIG. 11 is used.

In FIG. 13, a cover 31 of a light-sensitive film loading section is positioned at a part of a housing 30 on the side of an apparatus, for example, an X-ray image recording apparatus when the light-sensitive film is an X-ray film, or an image recording apparatus (for example, an apparatus using a scanning laser beam) when the light-sensitive film is a light-sensitive recording film for image recording. The housing 30 is divided by a shutter 34 into a film package loading chamber 32 at the upper section and a film receiving chamber 33 at the lower section. The film package loading chamber 32 is provided with an openable light-shielding cover 35, and a film package supporting base 36 is positioned on the inner surface of the light-shielding cover 35. At a portion of the supporting base 36 which is positioned on the upper side when the light-shielding cover 35 is closed, a clamp section 37 provided with a pair of clamp pins 37a is formed. On the right and left sides of the middle portion of the supporting base 36 are provided a pair of clamp bars 38 capable of symmetrically moving in the inward-outward direction. A pair of clamp pins 37a and used for engagement with a pair of clamp holes 19a and 19b, and a pair of clamp bars 38 are used for engagement with the notches 2a and 2b at the right and left side edges of the film stack 10. At the lower section of the film package loading chamber 32 are positioned an upper blade 39A and a lower blade 39B of a cutter for cutting a lower end edge 21b of the light-tight envelope 21. The upper blade 39A is movable in the direction of the arrow A. The lower blade 39B is stationary and secured to the inner surface of the light-shielding cover 35.

The shutter 34 is openably mounted between the upper chamber 32 and the lower chamber 33, and can be moved at right angles to FIG. 13. A tray 40 vertically slidable in the direction of the arrow B is positioned in the film receiving chamber 33, and a film exit 42 provided with an openable window 41 is positioned on the forward side of the lower section of the tray 40. The tray 40 can be moved upwardly into the film package loading chamber 32 until a bottom plate 40a of the tray 40 is positioned just below the film stack 10 in the film package loading chamber 32. Therefore, the film stack 10 can fall onto the tray 40 without receiving any shock.

Operations of the apparatus shown in FIG. 13 for daylight loading will now be described below.

First, the light-shielding cover 35 of the film package loading chamber 32 is opened, and a film package is placed on the film package supporting base 36 positioned on the inner surface of the light-shielding cover 35. At this time, the clamp holes 19a and 19b perforated through the projected portion 19D of the protective sheets 19A and 19B are engaged with a pair of clamp pins 37a formed on the inner surface of the light-shielding cover 35. Further, the clamp bars 38 positioned on both sides of the film package are moved inwardly for engagement with the notches 2a and 2b of the film stack 10 and the protective sheets 19A and 19B. Then, the light-shielding cover 35 is closed and locked. In this manner, the film package is positioned in the film package loading chamber 32 in the condition shielded from light as shown in FIG. 13.

Thereafter, the upper blade 39A of the cutter is moved in the direction of the arrow A to cut the lower end edge 21b of the light-tight envelope 21 in cooperation with the lower blade 39B. At this time, since the film stack 10 is held in the position higher than the cutter by engagement of the notches 2a and 2b with the clamp bars 38, there is no risk of the films being cut by the cutter. Then, the shutter 34 is opened, and the empty tray 40 is moved upwardly until the bottom plate 40a of the tray 40 reaches the vicinity of the lower end of the film stack 10. The clamp bars 38 are moved away from the film stack 10 to release the film stack 10. Therefore, the film stack 10 falls onto the tray 40 at a time. Then, as the tray 40 is moved down, the film stack 10 is sequentially withdrawn from the light-tight envelope 21 and the protective sheets 19A and 19B and, ultimately, completely shifted to the tray 40, as shown by the one-dotted lines in FIG. 13.

Then, the shutter 34 is closed, and the film loading in a daylight environment is completed. The light-shielding cover 35 is opened, and the emptied light-tight envelope 21 and the protective sheets 19A and 19B are taken out of the film package loading chamber 32. The openable window 41 of the film receiving chamber 33 is then opened, and the film sheets are fed one by one through the film exit 42 by a sheet feeding device using, for example, a sucker, and used for image recording.

When or before the film sheets in the film receiving chamber 33 run out, another film package is loaded to the film package loading chamber 32. By repeating the operations mentioned above, it is possible to always make a film package stand by and to efficiently load the films.

In the present invention, it is not necessarily required to form the notch at the side edge of the films as in the above-described embodiments. Namely, it is also possible to hold a stack of the films by sandwiching the film stack in the thickness direction thereof from outside the light-tight envelope, cut the lower end of the light-tight envelope in this condition while the light-tight envelope is held, and then release the film stack to allow it to fall. In this case, it is not necessary to form the clamp notch at the side edge of the films. Embodiments using such films will now be described below with reference to FIGS. 14 to 19.

Figure 14:
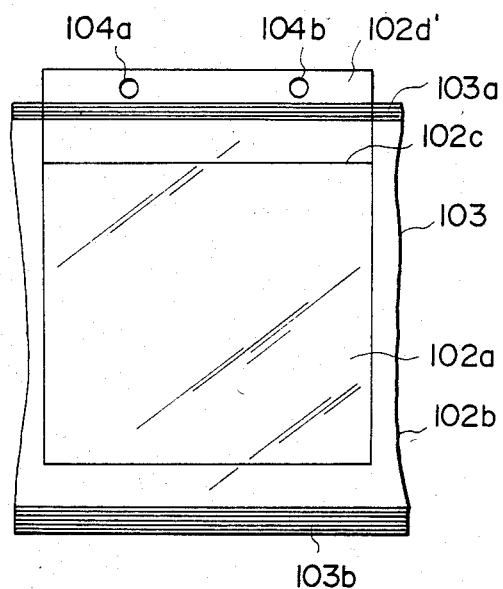
FIG. 14 is a plan view showing an embodiment of the film package used in another embodiment of the daylight film loading method in accordance with the present invention.
Figure 15:
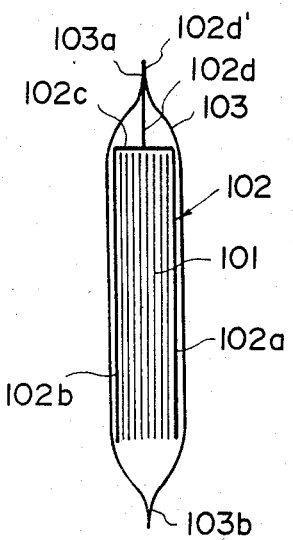
FIG. 15 is a sectional view showing the film package of FIG. 14, FIGS. 16 and 17 are sectional views showing further embodiments of the film package used in the daylight film loading method in accordance with the present invention.

In FIGS. 14 and 15 showing an embodiment of the film package comprising films having no notch, a stack of unexposed rectangular films 101 is sandwiched between a protective sheet 102 having a U-shaped cross-section, and inserted into a flexible light-tight envelope 103. The protective sheet 102 comprises a front sheet 102a, a rear sheet 102b, and an end portion 102c for connecting the front sheet 102a with the rear sheet 102b. The middle section of the end portion 102c is connected with a fixing portion 102d having a portion 102d' projected to the outside of the light-tight envelope 103. The fixing portion 102d is laminated (or sealed) with a seal portion 103a of the light-tight envelope 103, whereby the fixing portion 102d is secured to the light-tight envelope 103. Through the projected portion 102d' of the fixing portion 102d are perforated clamp holes 104a and 104b for engagement with external clamp pins or the like.

When the film package constructed as described above is used for film loading, the clamp holes 104a and 104b are engaged with clamp pins in a light-tight case, and the films 101 are held from above the protective sheet 102. After a lower end edge 103b of the light-tight envelope 103 is cut, holding of the films 101 and the protective sheet 2 is released. At this time, only the films 101 fall, and the protective sheet 102 and the light-tight envelope 103 are maintained in the condition held by the clamp pins. Therefore, the films 101 can be easily withdrawn from the light-tight envelope 103.

In the film package shown in FIGS. 14 and 15, the clamp holes 104a and 104b may be omitted when another means for holding the upper portion of the light-tight envelope is used.

Figure 16:
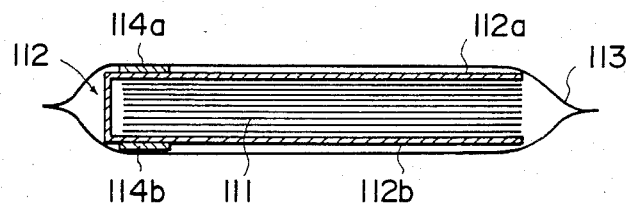

In FIG. 16 showing another embodiment of the film package comprising films having no notch, a plurality of films 111 are contained between a front sheet 112a and a rear sheet 112b of a protective sheet 112 having a U-shaped cross-section, and the combination is contained in a light-tight envelope 113. A double-faced adhesive tape 114a is interleaved between the outer surface of the front sheet 112a of the protective sheet 112 and the inner surface of the light-tight envelope 113. A double-faced adhesive tape 114b is interleaved between the outer surface of the rear sheet 112b and the inner surface of the light-tight envelope 113. In this manner, the protective sheet 112 is secured to the light-tight envelope 113. Also in this embodiment of the film package, only the films 111 fall by the weight thereof when the film package is held vertically and an end of the light-tight envelope 113 (on the open end side of the protective sheet 112) is cut. Therefore, it is possible to withdraw only the films 111 from the protective sheet 112 and the light-tight envelope 113.

Figure 17:
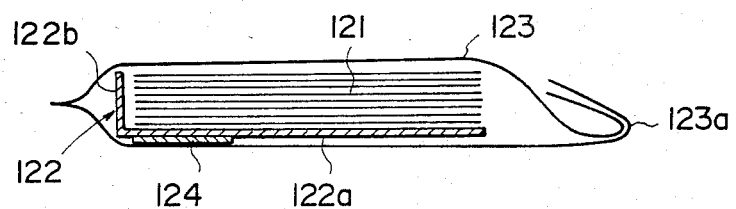

In FIG. 17 showing a further embodiment of the film package used in the present invention, there is used a protective sheet 122 having an L-shaped cross-section and comprising a bottom sheet 122a having approximately the same size as the size of films 121, and an end sheet 122b bent from an end of the bottom sheet 122a at right angles to the bottom sheet 122a. The outer surface of the bottom sheet 122a is secured to the inner surface of a light-tight envelope 123. An end of the light-tight envelope 123 is not sealed but simply folded at a portion 123a, and the films 121 contained in the light-tight envelope 123 is shielded from light by the folded portion 123a. This configuration further facilitates the shielding of the films 121 from light and the withdrawal of the films 121 from the light-tight envelope 123.

An embodiment of the daylight film loading method and apparatus in accordance with the present invention, wherein the film package as shown in FIGS. 14 and 15 is used, will now be described below with reference to FIGS. 18 and 19.

In FIGS. 18 and 19, a film loading section 130 of a recording apparatus for recording images by use of the light-sensitive films 101 is provided with a film loading chamber 132 having a light-shielding cover 131, and a film receiving chamber 134 adjoining the film loading chamber 132 via a shutter 133. The light-shielding cover 131 is pivotably supported at a lower end 131a and can be opened up to the position indicated by the onedotted chain line 131'. When the light-shielding cover 131 is opened to this position, the film package is loaded on a film package supporting base 140 formed on the inner surface of the light-shielding cover 131.

The film package supporting base 140 comprises clamp pins 141 provided at one end of the supporting base 140 for engagement with the clamp holes 104a and 104b of the film package, a supporting plate 142 for supporting the film package thereon, and a clamp lever 143 urged by a spring 144 in the direction holding the film package placed on the supporting plate 142 from above the film package onto the supporting plate 142. The clamp lever 143 is provided with a pin 143a on a side. The clamp lever 143 holds the film package placed on the supporting plate 142 from above the light-tight envelope 103 by the spring 144. After the light-shielding cover 131 is closed, the film package is held in an inclined position as shown in FIG. 18 by the force of the clamp lever 143 pressing the film package against the supporting plate 142.

On the inner surface of the light-shielding cover 131 is also provided a stationary blade 145 of a cutter for cutting the lower end portion 103b of the light-shielding envelope 103 of the film package after the light-shielding cover 131 is closed. A movable blade 146 of the cutter is positioned in the film loading chamber 132.

In the film receiving chamber 134, a slide case 150 is mounted slidably in the direction of the arrow A and can be moved between the film storing position in the film receiving chamber 134, which is indicated by the solid lines in FIG. 18, and the film receiving position in the film loading chamber 132, which is indicated by the solid lines in FIG. 19. The slide case 150 comprises a bottom plate 151 for receiving the lower ends of the films 101, a back plate 152 for receiving the back surface of the film stack, and a side plate 153 having a clamp releasing slope 153a on the upper side.

Film loading operations using the apparatus shown in FIGS. 18 and 19 will now be described below.

First, the light-shielding cover 131 is opened, and a film package is placed on the film package supporting base 140 on the inner surface of the light-shielding cover 131. At this time, the clamp holes 104a and 104b of the film package is engaged with the clamp pins 141. The clamp lever 143 is manually raised, the film package is inserted under the clamp lever 143, and the clamp lever 143 is returned to the pressing position. In this manner, the film package is pressed against the supporting plate 142 and held thereon by the clamping force of the spring 144. Further, the films 101 contained in the film package are shifted towards the end portion 102c of the protective sheet 102 by using a slight inclination of the light-shielding cover 131 opened to the position 131', so that the lower end portion of the light-tight envelope 103 can be cut easily.

Thereafter, the light-tight cover 131 is closed, and the film package is shielded from light. The lower end 103b of the light-tight envelope 103 is then cut by the cutter blades 145 and 146.

When films previously loaded to the slide case 150 in the film receiving chamber 134 run out, the shutter 133 is opened, and the slide case 150 is moved up. After the slide case 150 is moved up until the clamp releasing slope 153a of the side plate 153 of the slide case 150 contacts the pin 143a of the clamp lever 143, the slope 153a pushes the pin 143a and rotate the clamp lever 143 in the direction of the arrow B as shown in FIG. 19 to release the clamp of the film package. At this stage, the bottom plate 151 of the slide case 150 is positioned near the cut lower end of the light-tight envelope 103. When the clamp of the film package is released, the light-tight envelope 103 and the protective sheet 102 secured to the light-tight envelope 103 are maintained in the condition held and hung by the clamp pins 141, and only the films 101 fall by the weight thereof from the cut lower end opening of the light-tight envelope 103. The films 101 are received by the bottom plate 151 and the back plate 152 of the slide case 150.

Then, the slide case 150 is moved down in the direction of the arrow C to the film storing position indicated by the chain line in FIG. 19, and the shutter 133 is closed. Thereafter, the light-shielding cover 131 is opened, and the empty envelope 103 and the protective sheet 102 are removed.

Figure 20:
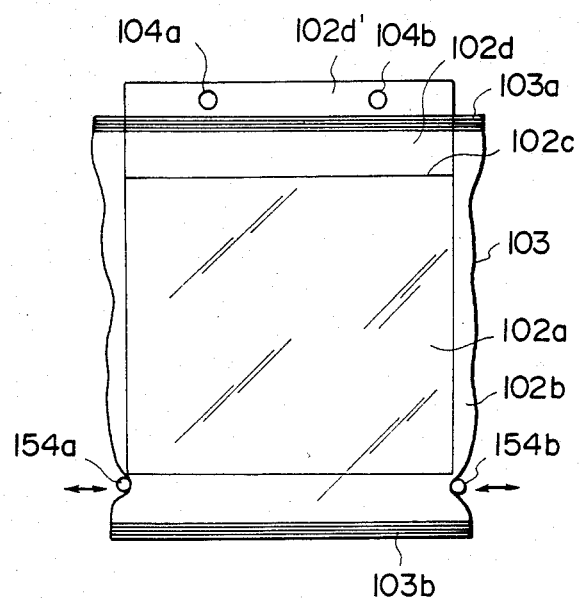
FIGS. 20 and 21 are a plan view and a side view, respectively, showing another embodiment of the film holding and releasing members in the daylight film loading apparatus in accordance with the present invention.
Figure 21:
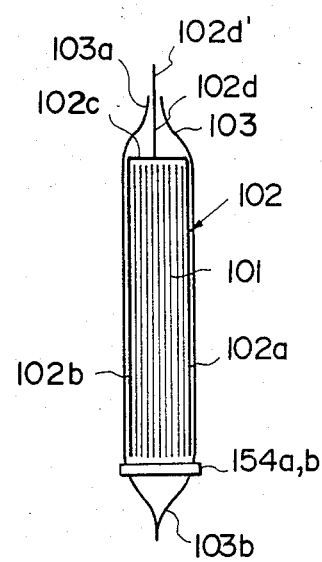

Daylight loading of the films 101 is conducted as described above. In the embodiment of FIGS. 18 and 19, the films 101 are temporarily held by sandwiching the films 101 in the thickness direction of the film stack from outside the light-tight envelope 103, and then released. However, as shown in FIGS. 20 and 21, it is also possible to insert film holding members 154a and 154b from outside the light-tight envelope 103 and from both sides of the films 101 near the lower end portions of the films 101, and then release the film holding members 154a and 154b to allow the films to fall.

The embodiments of FIGS. 14 to 21 are advantageous from the viewpoint of film manufacture since it is unnecessary to form a notch at the side edge of the film.

In the present invention, a step or a means for opening the lower end of the light-tight envelope of the film package is necessary. In the embodiment of FIG. 17 wherein the film stack is contained in the light-tight envelope an opening of which is not sealed, it is unnecessary to use a cutting means such as a cutter. However, in this case, since the lower end of the light-tight envelope is first folded and then unfolded to allow the films to fall, the unfolding step can be regarded as the end opening step, and the action of the films opening the folded portion when the films fall by the weight thereof can be regarded as a means for opening the lower end of the light-tight envelope.

I claim:

1. A method of loading films in a daylight environment by holding a film package, which comprises a light-tight envelope and a stack of unexposed light-sensitive films contained therein, in a vertical position in a loading chamber shielded from light, opening a lower end of said light-tight envelope while at least the films are prevented from falling, and then releasing said films with said light-tight envelope being held, thereby allowing said films to fall from said light-tight envelope by weight thereof, wherein the improvement comprises moving a film receiving case for receiving said films to the vicinity of the lower end of said film package before said films are allowed to fall, moving down said film receiving case after said films fall, thereby completely separating said films from said light-tight envelope, and thereafter closing a shutter between said light-tight envelope and said films to shield said films from light.

2. A daylight film loading apparatus comprising:
   (i) a first light-tight housing provided with an openable cover,
   (ii) a second light-tight housing provided with a film exit and positioned under said first light-tight housing,
   (iii) a shutter openably mounted between said first light-tight housing and said second light-tight housing,
   (iv) a means for holding a film package, which comprises a light-tight envelope and a stack of films contained therein, in a vertical position in said first light-tight housing, (v) a means for holding said light-tight envelope of said film package and releasing said film stack in said first light-tight housing, (vi) a means for opening a lower end of said light-tight envelope, and (vii) a film receiving case capable of reciprocating between a film receiving position below and near said film package in said first light-tight housing and a film storing position in said second light-tight housing.

3. An apparatus as defined in claim 2 wherein said means for holding said film package in a vertical position is joined with said means for holding said light-tight envelope and releasing said film stack, and comprises a clamp member for always clamping said light-tight envelope, and a film holding and releasing member for holding and then releasing said film stack.

4. An apparatus as defined in claim 3 wherein said film holding and releasing member comprises a supporting base and a movable pushing member for sandwiching therebetween said film stack contained in said light-tight envelope from outside said light-tight envelope in the thickness direction of said film stack.

5. An apparatus as defined in claim 3 wherein said film stack is provided with notches in approximately symmetric positions of both side edges, and said film holding and releasing member comprises a pair of clamp members capable of releasably engaging with said notches from outside said light-tight envelope.

6. An apparatus as defined in claim 3 wherein said film stack is provided with a notch at one side edge, and said film holding and releasing member comprises a clamp member for releasably engaging with said notch from outside said light-tight envelope, and a flat contact plate for contacting the other side edge opposite to said side edge provided with said notch.

7. An apparatus as defined in claim 3 wherein said light-tight envelope is provided with a clamp hole, and said clamp member is a clamp pin for always engaging with said clamp hole.

8. An apparatus as defined in claim 7 wherein said film holding and releasing member comprises a supporting base and a movable pushing member for sandwiching therebetween said film stack contained in said light-tight envelope from outside said light-tight envelope in the thickness direction of said film stack.

9. An apparatus as defined in claim 7 wherein said film stack is provided with notches in approximately symmetric positions of both side edges, and said film holding and releasing member comprises a pair of clamp members capable of releasably engaging with said notches from outside said light-tight envelope.

10. An apparatus as defined in claim 7 wherein said film stack is provided with a notch at one side edge, and said film holding and releasing member comprises a clamp member for releasably engaging with said notch from outside said light-tight envelope, and a flat contact plate for contacting the other side edge opposite to said side edge provided with said notch.

* * * * *